(12) United States Patent
Yasuumi et al.

(10) Patent No.: US 11,827,049 B2
(45) Date of Patent: Nov. 28, 2023

(54) LAMINATE FILM, AND POUCH-TYPE CONTAINER AND SEALING MATERIAL HAVING ORNAMENTAL LAMINATE FILM

(71) Applicants: TOYO SEIKAN CO., LTD., Tokyo (JP); TOYO SEIKAN GROUP HOLDINGS, LTD., Tokyo (JP)

(72) Inventors: Takahiro Yasuumi, Yokohama (JP); Yasushi Hatano, Yokohama (JP); Kazumi Ozawa, Yokohama (JP); Kouji Kuriyama, Yokohama (JP); Yoshihiro Ootani, Tokyo (JP); Yousuke Morita, Tokyo (JP)

(73) Assignees: TOYO SEIKAN CO., LTD., Tokyo (JP); SEIKAN GROUP HOLDINGS, LTD., Tokyo (JP)

( * ) Notice: Subject to any disclaimer, the term of this patent is extended or adjusted under 35 U.S.C. 154(b) by 838 days.

(21) Appl. No.: 15/745,475

(22) PCT Filed: Jul. 22, 2016

(86) PCT No.: PCT/JP2016/071575
§ 371 (c)(1),
(2) Date: Jan. 17, 2018

(87) PCT Pub. No.: WO2017/022527
PCT Pub. Date: Feb. 9, 2017

(65) Prior Publication Data
US 2019/0176510 A1    Jun. 13, 2019

(30) Foreign Application Priority Data

Aug. 6, 2015 (JP) ................................. 2015-155936

(51) Int. Cl.
*B44C 3/08* (2006.01)
*B65D 65/40* (2006.01)
(Continued)

(52) U.S. Cl.
CPC ................ *B44C 3/085* (2013.01); *B32B 3/00* (2013.01); *B32B 3/26* (2013.01); *B32B 3/263* (2013.01);
(Continued)

(58) Field of Classification Search
CPC ....... B29C 59/04; B29C 59/022; B29C 59/23; B29C 43/46; B29C 43/52; B29C 59/026;
(Continued)

(56) References Cited

U.S. PATENT DOCUMENTS 2,071,031 A * 2/1937 Franz, Jr. ................. B41M 1/24
101/32
4,091,154 A * 5/1978 Hirai ......................... B44C 1/24
428/158

(Continued)

FOREIGN PATENT DOCUMENTS

CN    201194453 Y    2/2009
CN    201530533 U    7/2010
(Continued)

OTHER PUBLICATIONS

Of Robertson, Gordon L., Food Packaging: Principles and Practice, 2nd Ed. p. 88 (Year: 2005).*
(Continued)

*Primary Examiner* — Lee E Sanderson
(74) *Attorney, Agent, or Firm* — Sughrue Mion, PLLC (57) ABSTRACT

The present invention relates to an ornamental laminate film made from at least an inside film and an outside film, provided with a letter and/or a pattern by printing and as a raised part protruding toward the outside film. At least apart of the letter and/or the pattern has a metallic luster and differs in at least one of hue, brightness, chroma and glossiness from a region other than the letter and/or the pattern, and the raised part is formed along at least a part of (Continued)

the letter and/or the pattern. As a result of that, an ornamental laminate film with excellent design is provided without impairing its function as a packaging material.

11 Claims, 8 Drawing Sheets

(51) Int. Cl.
| | |
|---|---|
| B32B 27/08 | (2006.01) |
| B32B 27/32 | (2006.01) |
| B32B 27/34 | (2006.01) |
| B32B 27/36 | (2006.01) |
| B44F 1/02 | (2006.01) |
| B65D 77/20 | (2006.01) |
| B65D 33/00 | (2006.01) |
| B32B 3/30 | (2006.01) |
| B32B 27/00 | (2006.01) |
| B32B 15/08 | (2006.01) |
| B32B 15/088 | (2006.01) |
| B32B 3/26 | (2006.01) |
| B32B 15/09 | (2006.01) |
| B32B 15/20 | (2006.01) |
| B32B 3/00 | (2006.01) |
| B32B 38/12 | (2006.01) |
| B32B 38/00 | (2006.01) |
| B32B 38/06 | (2006.01) |
| B32B 3/28 | (2006.01) |
| B65D 75/00 | (2006.01) |

(52) U.S. Cl.
CPC ............ *B32B 3/30* (2013.01); *B32B 15/08* (2013.01); *B32B 15/088* (2013.01); *B32B 15/09* (2013.01); *B32B 15/20* (2013.01); *B32B 27/00* (2013.01); *B32B 27/08* (2013.01); *B32B 27/32* (2013.01); *B32B 27/34* (2013.01); *B32B 27/36* (2013.01); *B44F 1/02* (2013.01); *B65D 33/00* (2013.01); *B65D 33/004* (2013.01); *B65D 65/40* (2013.01); *B65D 77/20* (2013.01); *B32B 3/28* (2013.01); *B32B 38/06* (2013.01); *B32B 38/12* (2013.01); *B32B 38/145* (2013.01); *B32B 2250/02* (2013.01); *B32B 2250/03* (2013.01); *B32B 2250/24* (2013.01); *B32B 2255/10* (2013.01); *B32B 2255/205* (2013.01); *B32B 2307/31* (2013.01); *B32B 2307/40* (2013.01); *B32B 2307/402* (2013.01); *B32B 2307/406* (2013.01); *B32B 2307/4023* (2013.01); *B32B 2307/416* (2013.01); *B32B 2307/538* (2013.01); *B32B 2439/00* (2013.01); *B32B 2439/06* (2013.01); *B32B 2439/40* (2013.01); *B32B 2439/46* (2013.01); *B32B 2439/70* (2013.01); *B32B 2581/00* (2013.01); *B65D 75/008* (2013.01)

(58) Field of Classification Search
CPC .......... B32B 3/30; B32B 38/06; B32B 15/04; B32B 15/09; B32B 2307/538; B44C 1/14; B44C 1/24; B44C 3/085; B41M 1/24; B44F 7/00; B44F 1/02; B42D 2035/20; Y10T 428/248082; Y10T 428/24893; Y10T 156/1023; C09D 11/00; C09D 11/025; C09D 11/03; C09D 11/033; C09D 11/037; B31B 50/88; G09F 7/165; B65D 75/008
USPC ....................................................... 428/35.8
See application file for complete search history.

(56) References Cited

U.S. PATENT DOCUMENTS

| | | | |
|---|---|---|---|
| 5,055,343 A | 10/1991 | Murphy | |
| 5,950,533 A * | 9/1999 | Kildune | B31F 1/07 |
| | | | 101/23 |
| 5,961,706 A * | 10/1999 | Bechly | C09D 11/02 |
| | | | 106/31.9 |
| 2003/0072919 A1* | 4/2003 | Watts, Jr. | B32B 3/00 |
| | | | 428/159 |
| 2004/0170810 A1* | 9/2004 | Rasmussen | B32B 27/32 |
| | | | 428/174 |
| 2005/0106344 A1* | 5/2005 | Morris | B32B 7/12 |
| | | | 428/35.3 |
| 2005/0123726 A1* | 6/2005 | Broering | B32B 3/30 |
| | | | 428/172 |
| 2007/0022901 A1* | 2/2007 | Kurze | C09D 11/101 |
| | | | 106/31.6 |
| 2011/0189445 A1* | 8/2011 | Takeuchi | B44C 1/175 |
| | | | 428/195.1 |
| 2016/0059512 A1* | 3/2016 | Proksch | B29C 59/022 |
| | | | 428/156 |

FOREIGN PATENT DOCUMENTS

| | | | | |
|---|---|---|---|---|
| EP | 2565131 A1 * | 3/2013 | | B29C 59/02 |
| JP | 1-234241 A | 9/1989 | | |
| JP | 2000-33660 A | 2/2000 | | |
| JP | 2009-90507 A | 4/2009 | | |
| JP | 2009-172998 A | 8/2009 | | |
| JP | 2009172998 A * | 8/2009 | | |
| JP | 4370768 B2 | 11/2009 | | |
| JP | 2009-286076 A | 12/2009 | | |
| JP | 2010076132 A * | 4/2010 | | |
| JP | 2011-154175 A | 8/2011 | | |
| JP | 5150433 B2 | 2/2013 | | |
| JP | 2014046655 A * | 3/2014 | | |

OTHER PUBLICATIONS

International Search Report for PCT/JP2016/071575 dated Oct. 25, 2016 [PCT/ISA/210].
Communication dated Dec. 21, 2018, from the European Patent Office in application No. 16832806.0.

* cited by examiner

LAMINATE FILM, AND POUCH-TYPE CONTAINER AND SEALING MATERIAL HAVING ORNAMENTAL LAMINATE FILM

CROSS REFERENCE TO RELATED APPLICATIONS

This application is a National Stage of International Application No. PCT/JP2016/071575, filed on Jul. 22, 2016, which claims priority from Japanese Patent Application No. 2015-155936, filed on Aug. 6, 2015, the contents of all of which are incorporated herein by reference in their entirety.

TECHNICAL FIELD

The present invention relates to an ornamental laminate film on which a letter and/or a pattern is formed by printing and with a raised part, and more specifically, an ornamental laminate film with excellent design where three-dimensionality of the letter and/or the pattern is emphasized. The present invention further relates a pouch-type container having the ornamental laminate film and a sealing material having the ornamental laminate film.

BACKGROUND ART

Pouch-type containers such as pouches are filled with semifluid or fluid contents like food, beverage and detergents, and sealing materials are used as closures for cup-like or tray-like containers. It is required that such containers and sealing materials be arranged with letters to indicate the product name or the like together with various patterns for the purpose of differentiate the content from products of other manufactures or enhancing the product value. For satisfying the requirements, the letters and/or the patterns may be highlighted by techniques such as printing three-dimensional letters and/or patterns.

For instance, Patent document 1 below proposes a pouch-type container having an embossed pattern formed by heating a raised part formed in accordance with the emboss pattern to a predetermined temperature, thereby bringing the raised part into contact with a surface of a soft packaging material to partly shrink the soft packaging material, so that the soft packaging material may swell outward to form an embossed pattern. In this embossed pouch-type container, an embossed pattern with a texture different from that provided by printing is formed on the pouch-type container, which is, however, insufficient to provide a synergy effect by the combination of the embossed pattern and the printing. As a result, satisfactory effect cannot be obtained from the viewpoint of design.

Patent document 2 below proposes a laminate film formed by laminating a plurality of films different from each other in the thermal expansion coefficients. The laminate film is pressed with a heated mold of a letter or a mark so that the shape of the mold will be swelled. Alternatively, a laminate film is produced by transferring a foil with a shape of the mold to a laminate film together with swelling the shape of the mold. In this laminate film, it is possible to swell the letter and/or mark itself and form a three-dimensional letter and/or mark.

PRIOR ART DOCUMENTS

Patent Documents

Patent Document 1: JP 4370768
Patent Document 2: JP 5150433

OUTLINE OF THE INVENTION

Problems that the Invention is to Solve

In any of the aforementioned methods, a laminate film made from a plurality of films different from each other in the thermal expansion coefficients is heat-pressed to make the laminate film partly swell, thereby imparting three-dimensionality to the letter and/or the mark. Even by these methods, the ornamental effect provided by the swelling still may not be fully satisfactory. When the area or the amount of the swelling is increased to enhance the ornamental effect, the thickness of the film arranged at the inside may be decreased partly to make it difficult to maintain the material strength and the barrier property. As a result, properties for protecting and preserving contents cannot be ensured, and thus, the packaging material is not suitable for practical use.

Therefore, an object of the present invention is to provide an ornamental laminate film with excellent design, which is ornamented by printing design and a raised part, without impairing its function as a packaging material.

Another object of the present invention is to provide a pouch-type container and a sealing material, both of which have three-dimensionally emphasized letters and/or patterns and are designed with an excellent ornamental effect.

Means for Solving the Problems

The present invention provides an ornamental laminate film comprising at least an inside film and an outside film, provided with a letter and/or a pattern by printing and with a raised part protruding toward the outside film, wherein at least a part of the letter and/or the pattern has a metallic luster and differs in at least one of hue, brightness, chroma and glossiness from a region other than the letter and/or the pattern, and the raised part is formed along at least a part of the letter and/or the pattern.

Preferably the ornamental laminate film of the present invention possesses the following features:

1. The metallic luster of the letter and/or the pattern is derived from a deposition layer formed on the outside film or a print layer constituting the letter and/or the pattern;
2. The letter and/or the pattern has a difference in brightness from a region other than the letter and/or the pattern, and the raised part is formed on a relatively bright area;
3. An area to be shaded when the raised part is irradiated with light from one direction is provided with printing to emphasize a shadow of the raised part;
4. The raised part has a surface roughness higher than a surface roughness of an area surrounding the raised part, and the raised part and the area surrounding the raised part are different from each other in glossiness;
5. The raised part is formed along an outline of the letter and/or the pattern;
6. At least a part of the letter and/or the pattern partitioned by the raised part has an inner region with a surface roughness higher than a surface roughness in a region other than the letter and/or the pattern, and the inner region and the region other than the letter and/or the pattern are different from each other in glossiness;
7. The raised part has a height in a range of 0.1 to 0.35 mm, and a width of not more than 5 mm;
8. The raised part is formed by shaping a laminate film by compressing a cold, warm or hot process to allow the laminate film to protrude toward the outside film;

9. The inside film stretches greatly and the outside film stretches moderately in a vicinity of an inside of an edge of the raised part; and 10. The laminate film comprises an inside film of polyethylene, an outside film of stretched nylon or stretched polyethylene terephthalate, and an aluminum deposition stretched polyethylene terephthalate film or an aluminum deposition stretched nylon film is arranged between the inside film and the outside film.

Further, the present invention provides a pouch-type container having the aforementioned ornamental laminate film.

Further, the present invention provides a sealing material including the ornamental laminate film.

Hereinafter, the "letter and/or pattern" may be expressed as "pattern" or "print design".

Effects of the Invention

In the ornamental laminate film of the present invention, patterns formed by a combination of a print and a raised part have a metallic luster that may strikingly emphasize the raised part. Furthermore, at least one of the hue, the brightness, the chroma and the glossiness at the pattern is differentiated from that in the region other than the pattern, and thus, the pattern is clearly distinguished from the background, and the three-dimensionality is enhanced. When combined with the raised part formed along at least a part of the letter or the pattern, these effects can improve remarkably the ornamental effect in comparison with conventional ornament provided by a combination of a print and a raised part.

The aforementioned effects of the present invention are evident from the results of Examples described below.

Figure 12A:
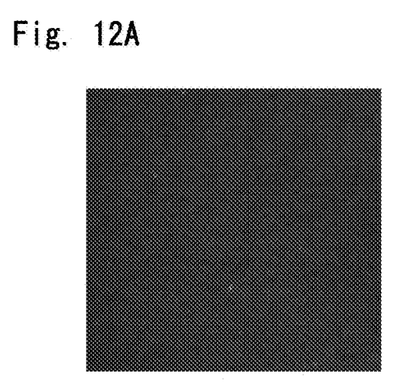
FIGS. 12A and 12B are black-and-white photocopies of color drawings each showing before (FIG. 12A) and after (FIG. 12B) formation of a raised part on an ornamental laminate film prepared in Comparative Example 2.
Figure 12B:
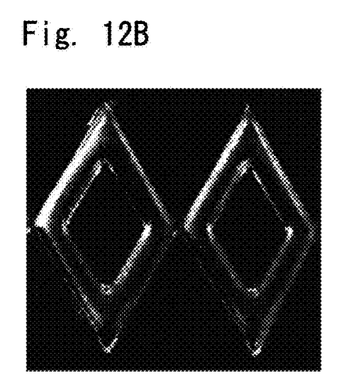
Figure 13A:
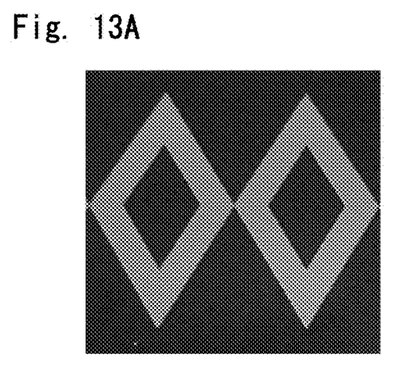
Figure 13B:
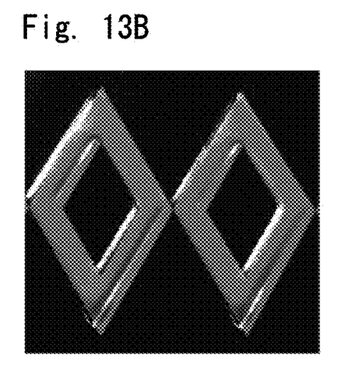
Figure 14A:
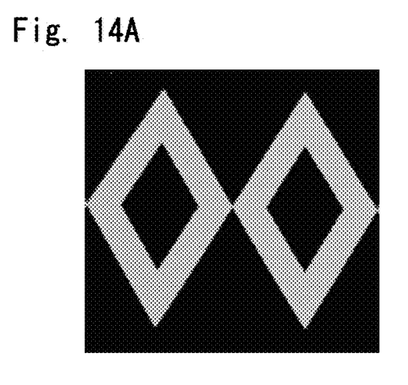
FIGS. 14A and 14B are black-and-white photocopies of color drawings each showing before (FIG. 14A) and after (FIG. 14B) formation of a raised part on an ornamental laminate film prepared in Example 3.
Figure 14B:
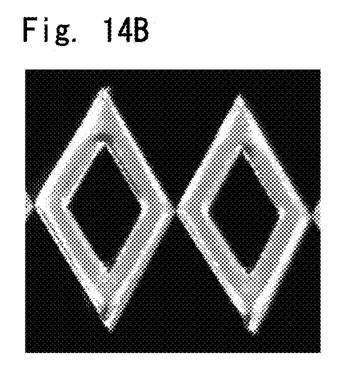

FIGS. 12A and 12B show Comparative Example 2 where a laminate film provided with printing in black as a whole is used, on which a pattern is formed as a raised part and the pattern does not have a metallic luster. FIGS. 13A and 13B show Example 2 where a laminate film having a pattern region printed in gold and the remaining region printed in black is used, on which a pattern is formed as a raised part. FIGS. 14A and 14B show Example 3 where a laminate film having a patterned region without a print and exhibiting its silvery ground color (color of aluminum) is used, while the remaining region other than the pattern is printed in black and the pattern is formed as a raised part. The ornamental effect is apparently improved in FIGS. 13A, 13B, 14A and 14B all having a metallic luster, in comparison with that in FIGS. 12A and 12B.

Figure 8A:
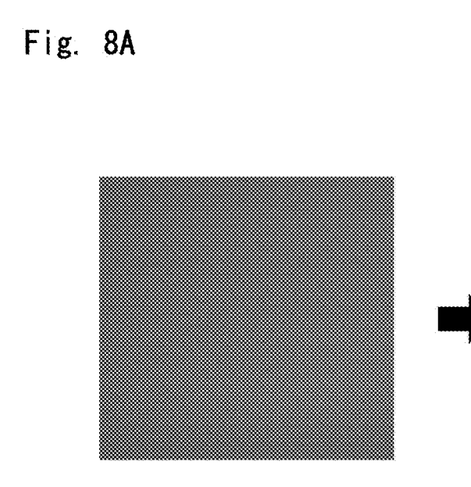
FIGS. 8A and 8B are black-and-white photocopies of color drawings each showing before (FIG. 8A) and after (FIG. 8B) formation of a raised part on an ornamental laminate film prepared in Comparative Example 1.
Figure 8B:
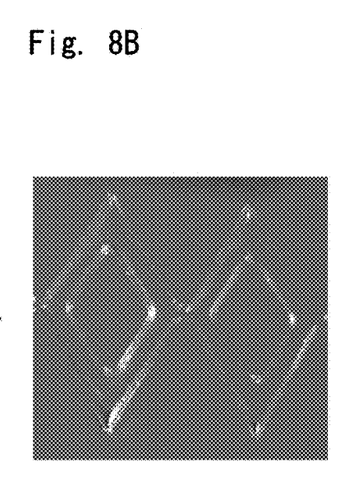
Figure 9A:
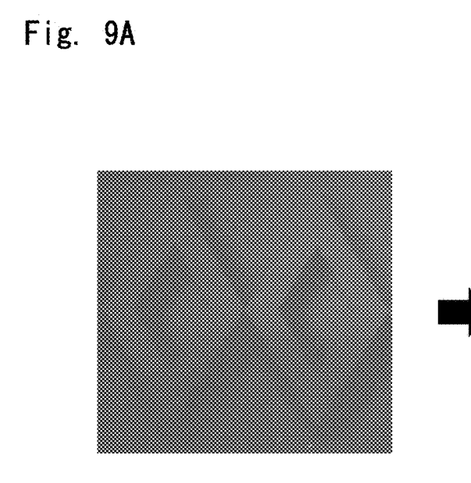
FIGS. 9A and 9B are black-and-white photocopies of color drawings each showing before (FIG. 9A) and after (FIG. 9B) formation of a raised part on the ornamental laminate film prepared in Example 1.
Figure 9B:
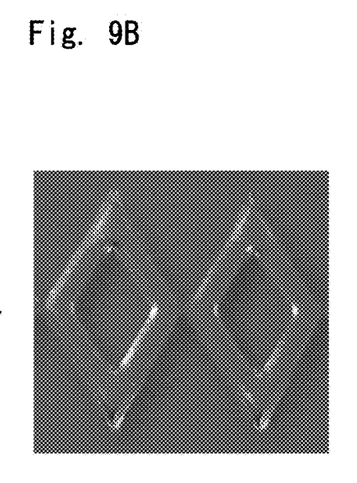

FIGS. 8A and 8B show Comparative Example 1 where a laminate film provided with printing in gold as a whole is used, on which a pattern is formed as a raised part, and there is no substantial difference in the hue or the like between the pattern and the remaining region. FIGS. 9A and 9B show Example 1 where a laminate film with a shadow printed along the outline of a gold color pattern is used, on which the pattern is formed as a raised part. In comparison with FIGS. 8A and 8B, the three-dimensionality of the pattern in FIGS. 9A and 9B imparted with a shadow is more emphasized, indicating improvement in the ornamental effect.

Figure 10A:
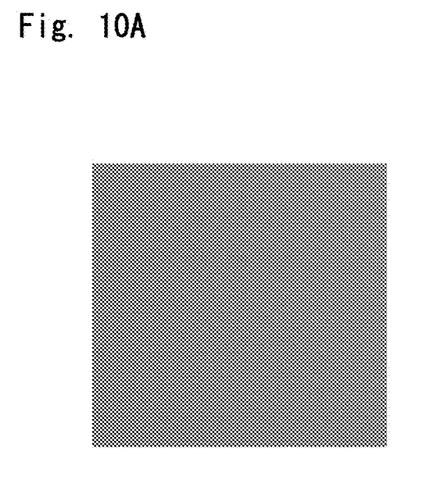
FIGS. 10A and 10B are black-and-white photocopies of color drawings each showing before (FIG. 10A) and after (FIG. 10B) formation of a raised part on an ornamental laminate film prepared in Comparative Example 3.
Figure 10B:
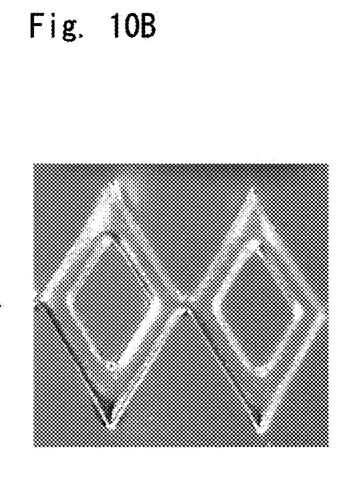
Figure 11A:
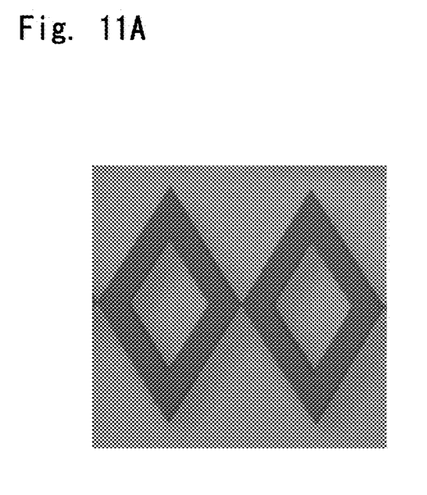
FIGS. 11A and 11B are black-and-white photocopies of color drawings each showing before (FIG. 11A) and after (FIG. 11B) formation of a raised part on an ornamental laminate film prepared in Example 4.
Figure 11B:
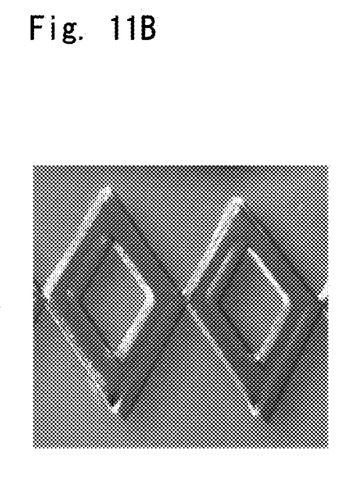

FIGS. 10A and 10B show Comparative Example 3 where a laminate film exhibiting its ground color (aluminum color) without a print is used. A pattern is formed thereon as a raised part, and there is no substantial difference in the hue or the like between the pattern and the remaining region. FIGS. 11A and 11B show Example 4 using a laminate film having a ground color (aluminum color) on which a pattern is printed in a color different from the ground color and further a shadow is printed along the outline of this pattern, and forming a raised part in the pattern region. In FIGS. 11A and 11B where the pattern is formed in a color different from the color of the remaining region, three-dimensionality of the pattern is more emphasized than that in FIGS. 10A and 10B, indicating evident improvement in the ornamental effect.

In the present specification, explanation for the attached drawings (excepting FIG. 15) is based on color drawings (photographs) as the original for the black-and-white photocopies.

As described above, the raised part is highlighted effectively at least apart of the pattern by means of a metallic luster, hue, brightness, chroma, glossiness or the like. As a result, there is no necessity of increasing the height and width of the raised part. Moreover, when a packaging material such as a pouch-type container or a sealing material is made from the ornamental laminate film, the packaging material shows good resistance to breakage caused by dropping, excellent barrier property for a long period of time and excellent mechanical strength.

Further, by using a laminate film including a more stretchable film on the inner side and a less stretchable film on the outer side, the raised part can be shaped to protrude in any of cold, warm and hot processes, i.e., the shaping ability is also excellent.

BRIEF DESCRIPTION OF THE DRAWINGS

FIGS. 1A and 2B are black-and-white photocopies of color drawings each showing before (FIG. 1A) and after (FIG. 1B) formation of raised part for an embodiment of printing a shadow to entirely surround letters on an ornamental laminate film of the present invention.

FIGS. 13A and 13 B are black-and-white photocopies of color drawings each showing before (FIG. 13A) and after (FIG. 13B) formation of a raised part on an ornamental laminate film prepared in Example 2.

MODE FOR CARRYING OUT THE INVENTION (Ornamental Laminate Film)

In the present invention, the metallic luster of at least a part of the pattern is provided by the metallic luster of the ground color of the laminate film due to the presence of a vapor deposition layer of a metal such as aluminum as mentioned below. The metallic luster can be provided also by printing by use of a high-brightness ink containing a pearlescent pigment or a powder of a metal such as aluminum.

Further, since at least one of the hue, the brightness, the chroma and the glossiness imparted to the pattern is different from that at the area without the pattern, the pattern is clearly distinguished from the area without the pattern. The raised part formed along the outline of the pattern may also help to enhance the three-dimensionality.

Figure 1A:
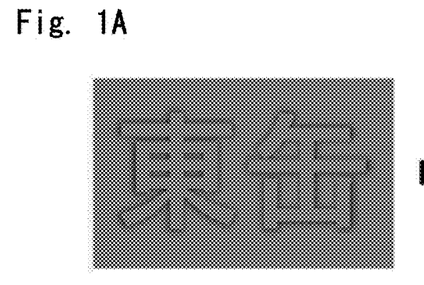
Figure 1B:
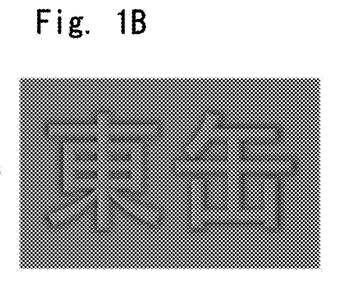

For instance, as shown in FIGS. 1A and 1B, a laminate film having a ground color of an aluminum deposition film is provided with a gold-color luster by a yellow printing, and also the letters are imparted with shadows printed in black at the entire outlines (FIG. 1A) and the letters are processed to make raised parts (FIG. 1B). In this embodiment, the letters become clearly three-dimensional in comparison with another embodiment (FIGS. 4A and 4B) where the letters are formed with only the raised parts.

Figure 2A:
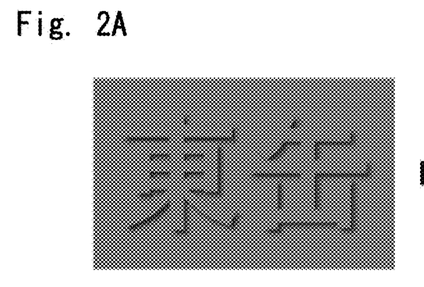
FIGS. 2A and 2B are black-and-white photocopies of color drawings each showing before (FIG. 2A) and after (FIG. 2B) formation of a raised part for an embodiment of printing a shadow, assuming that the letters are irradiated with light from a diagonal upper-left direction on the ornamental laminate film of the present invention.
Figure 2B:
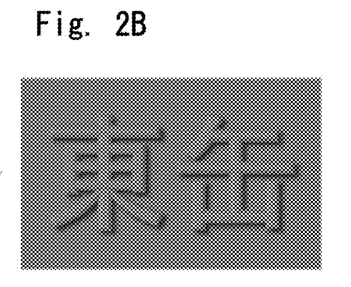

Further, in the embodiment as shown in FIGS. 2A and 2B, a laminate film having a gold-color luster similarly to the embodiment shown in FIGS. 1A and 1B is prepared. A shadow is printed in black at a part of the right side of the letters on this laminate film, assuming a case where the three-dimensional-letters are irradiated with light from a diagonal left direction (FIG. 2A), and the letters are processed to make raised parts (FIG. 2B). This embodiment can provide the letters with clearer three-dimensionality in comparison with not only the Comparative Example shown in FIG. 4 but the embodiment of the present invention shown in FIGS. 1A and 1B.

Figure 3A:
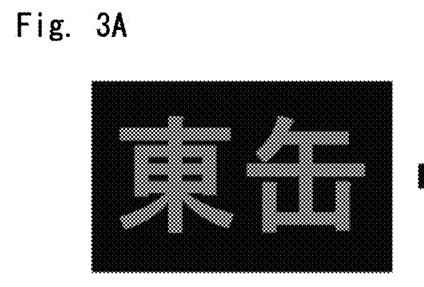
FIGS. 3A and 3B are black-and-white photocopies of color drawings each showing before (FIG. 3A) and after (FIG. 3B) formation of a raised part for an embodiment of printing in black to entirely surround letters with a high brightness on the ornamental laminate film of the present invention.
Figure 3B:
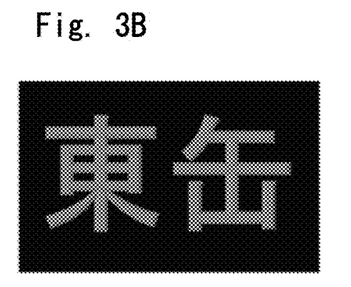

In the embodiment shown in FIGS. 3A and 3B, the region of letters is printed to have a gold-color luster with high brightness while the remaining region other than the letters is printed in black (FIG. 3A), and these letters are processed to make raised parts (FIG. 3B). In this embodiment, the raised part and the color contrast between the gold color and black make the letters clear and three-dimensional.

Figure 5A:
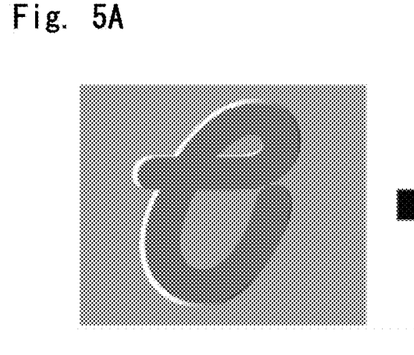
FIGS. 5A and 5B are black-and-white photocopies of color drawings each showing before (FIG. 5A) and after (FIG. 5B) formation of a raised part for an embodiment of printing black and white rims at a part of periphery of a gold-color letter on the ornamental laminate film of the present invention.
Figure 5B:
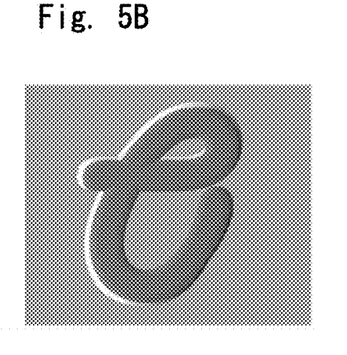

In the embodiment shown in FIGS. 5A and 5B, an alphabet 'e' is printed in yellow on a laminate film having a ground color of an aluminum deposition film, and the left side of the letter is printed in white from the upper end to the lower end like across section while a shadow is printed in black at a part of the right side of the letter (FIG. 5A). Then, the area printed in white and the area printed in yellow are processed to make raised parts (FIG. 5B). In this embodiment, the three-dimensionality at the letter is made remarkable by the synergetic effect of the cross section and the shadow of the letter and the raised parts.

In the aforementioned examples, the entire pattern is made three-dimensional with the raised part. However, in a case of using the ornamental laminate film of the present invention as a pouch-type container like a pouch or a packaging material like a sealing material, the film is required to have a mechanical strength and a barrier property. It is preferable, therefore, that the main raised part has a width of not more than 5 mm, and in particular in a range of 1 to 3 mm, and the height of the raised part is not more than 0.35 mm, and in particular in a range of 0.1 to 0.35 mm. In light of this, in a case of forming a large pattern, preferably a part of the pattern, such as the outer periphery thereof is rimmed with a raised part.

In the aforementioned specific example, the surface roughness at the raised part is made higher than the surface roughness of the area surrounding the raised part, thereby providing a difference in the glossiness therebetween. In this manner, the light is scattered on the raised part to further emphasize the three-dimensionality of the letters and patterns, and thus, an ornamental effect with excellent design can be provided.

Figure 6:
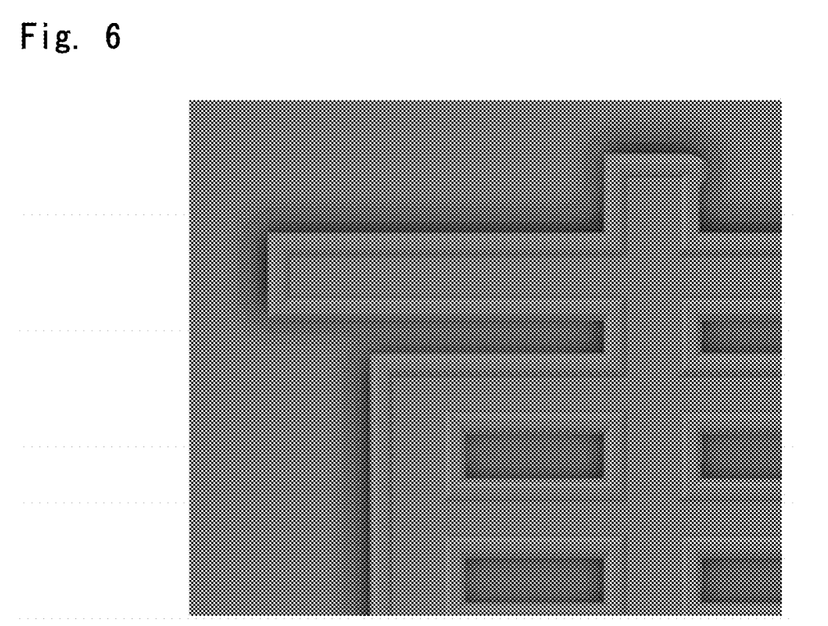
FIG. 6 is a black-and-white photocopy of a partially enlarged color drawing for illustrating another embodiment for the ornamental laminate film of the present invention.

FIG. 6 is an enlarged view showing a part of a pattern of another embodiment for the ornamental laminate film of the present invention. In this embodiment, a gold-color luster is provided by a yellow print on a laminate film having a ground color of an aluminum deposition film. Further, the entire outline of the letter is imparted with a shadow by printing in black, and the outline of this letter is processed to make a raised part. In this embodiment, in order to keep the function as a packaging material, the outlines of the letter (outer periphery and inner periphery) are formed with raised parts having a height of not more than 0.35 mm and a width of not more than 5 mm. As a result, the entire letter can be expressed three-dimensionally by the synergy effect provided by the shadow formed along the outlines and the raised parts. By using this effect, even if the pattern is a large and thick letter or the like, it can be imparted with an ornamental effect with three-dimensionality. Moreover, in the process of shaping the raised parts of the letter outline, a mold for processing the inner region of a letter partitioned by the raised parts is adjusted to be higher than the area surrounding the letter and a little lower than the mold for processing the raised parts so that it is possible to swell a little both the raised parts and the inner region of the letter partitioned by the raised parts simultaneously. As a result, it is possible to easily emphasize the three-dimensionality of the entire letter.

Figure 7:
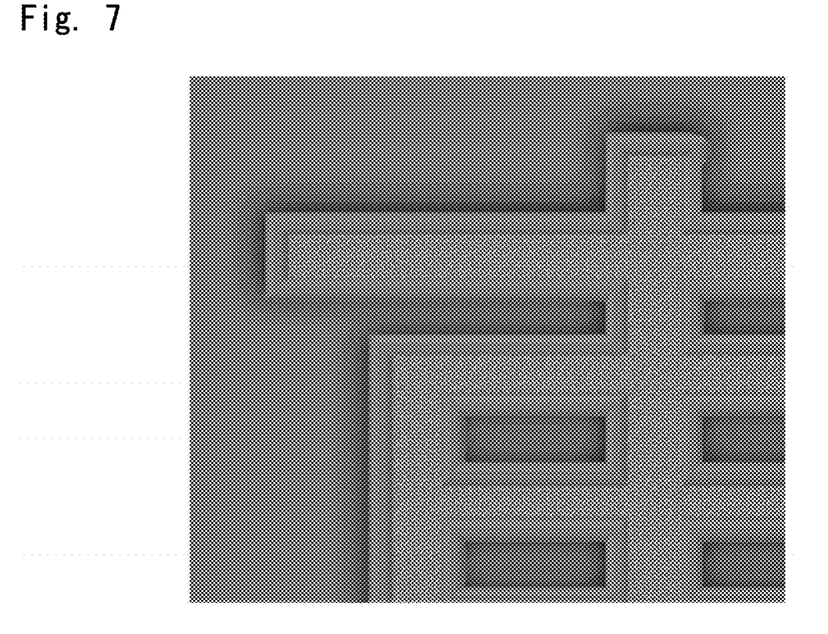
FIG. 7 is a black-and-white photocopy of a partially enlarged color drawing for illustrating a still other embodiment for the ornamental laminate film of the present invention.

FIG. 7 shows an embodiment where the embodiment shown in FIG. 6 is processed further to differentiate the glossiness. In the embodiment shown in FIG. 6, both the letter and the area other than the letter have gold-color luster. In the embodiment shown in FIG. 7, the inner region of the letter partitioned with the raised parts is formed as the roughened surface, whereby the luster is impaired. As a result, the texture of the letter is differentiated remarkably from that of the area other than the letter, and the three-dimensionality at the letter is enhanced further in comparison with that in FIG. 6. In this case, the mold for processing the inner region of the letter partitioned by the raised parts is adjusted to be higher than the area surrounding the letter and a little lower than the mold for processing the raised parts, and its surface is roughened. By adjusting the roughness of the mold surface, as mentioned above, the light may be scattered on the surface to further emphasize the three-dimensionality of the letter and the pattern, and thus, an ornamental effect with excellent design can be provided.

The ornamental laminate film of the present invention is a laminate film made from at least an inside film and an outside film, where a letter and/or a pattern is provided by printing and as a raised part protruding toward the outside film. As mentioned above, the ornamental laminate film of the present invention is not limited to any of the aforementioned specific embodiments as long as it satisfies requirements: at least a part of the letter and/or the pattern has a metallic luster; at least a part of the letter and/or the pattern differs in at least one of hue, the brightness, the chroma or the glossiness from a region other than the letter and/or the pattern; and the raised part is formed along at least apart of the letter and/or the pattern.

For instance, in the specific examples shown in FIGS. 1A, 1B, 2A, 2B, 3A, 3B, 4A, 4B, 5A, 5B, 6 and 7, the area other than the pattern has also an even metallic luster. However, the area other than the pattern may have a matte texture without glossiness. As for the pattern, it is not required to have the metallic luster as a whole, but it may have the metallic luster partially so that only a part of the letter may be shiny.

Figure 4A:
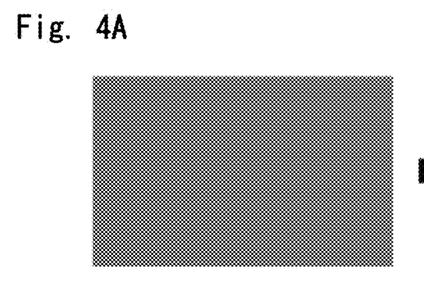
FIGS. 4A and 4B are black-and-white photocopies of color drawings each showing before (FIG. 4A) and after (FIG. 4B) formation of a raised part for an embodiment of not printing letters but forming the letters with the raised part on the ornamental laminate film of the present invention.
Figure 4B:
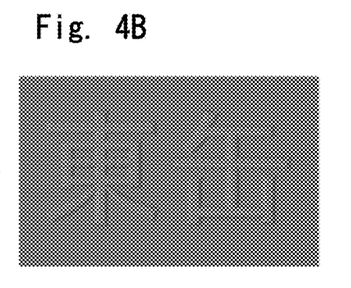

In the specific examples shown in FIGS. 1A, 1B, 2A, 2B, 3A, 3B, 4A, 4B, 5A, 5B, 6 and 7 excepting FIGS. 4A and 4B, the colors employed are different in all of the hue, the brightness, and the chroma. Similar effect can be obtained even when only the brightness and the chroma vary, e.g., in a case of gradation or blur.

Furthermore, in the specific examples shown in FIGS. 1A, 1B, 2A, 2B, 3A, 3B, 4A, 4B, 5A and 5B, the entire pattern is processed with a uniform raised part. In the specific examples shown in FIGS. 6 and 7, the outline (a part) of the pattern is processed with a uniform raised part, but it is also possible to combine raised parts different from each other in the width and the height.

(Method for Producing Ornamental Laminate Film)

The ornamental laminate film of the present invention is produced by printing a letter and/or pattern on a laminate film, and then by shaping a raised part.

Preferably, printing a pattern on a laminate film is conducted by printing in advance on a film constituting the laminate film, and laminating the film with another film. According to this method, it is possible to form a print layer inside the laminate film. As a result, damage on the print layer can be prevented effectively without providing a protective layer like a top coat layer on the print layer. Specifically, it is preferable that the print is imparted on the inner side of the outside film.

Conventionally known printing methods can be employed for printing, and the examples include gravure printing, flexographic printing, offset printing, inkjet printing, and screen printing. In the ornamental film of the present invention, gravure printing and flexographic printing are preferred in particular, since they can be performed at a high speed.

Further, in the ornamental laminate film of the present invention, the letter and/or the pattern can be formed on the laminate film by using a silver color (aluminum color) of the ground color of a metal deposition layer of aluminum or the like.

[Laminate Film]

For the laminate film in the ornamental laminate film of the present invention, it is preferable to use a laminate film having a more stretchable inside film and a less stretchable outside film from the viewpoint of shaping the raised part as mentioned below.

For the more stretchable film used for the inside film, a film formed of polyethylene, polypropylene or the like and having a heat-seal property is preferred. For the less stretchable film used for the outside film, a stretch film of nylon, polyethylene terephthalate (hereinafter, it may be referred to as "PET") or the like may be used preferably.

In the present invention, it is required that at least a part of the pattern have a metallic luster. Therefore, it is preferable as described above that the laminate film includes a metal deposition film such as an aluminum deposition film, and that the laminate film has a metallic luster as its ground color.

The specific examples that can be used preferably though not limited thereto include, in the order of inner surface/outer surface: polyethylene film/stretched nylon film, polyethylene film/stretched nylon film/stretched PET film, polyethylene film/stretched PET film/stretched nylon film, polyethylene film/aluminum deposition stretched nylon film/stretched PET film, polyethylene film/aluminum deposition stretched PET film/stretched nylon film, polypropylene/stretched nylon film, polypropylene film/stretched nylon film/stretched PET film, polypropylene film/stretched PET film/stretched nylon film, polypropylene film/aluminum deposition stretched nylon film/stretched PET film, and polypropylene film/aluminum deposition stretched PET film/stretched nylon film.

It is particularly preferable that the thicknesses of the inside film and the outside film before shaping the raised part are as follows from the viewpoint of process of shaping the raised part, namely, the inside film has a thickness in a range of 50 to 200 µm, the outside film has a thickness in a range of 10 to 30 µm, and the inside film has a thickness about 3 to about 20 times the thickness of the outside film, though the thicknesses are not limited to these ranges.

One or more other layer(s) may be formed further as long as the effect of the present invention is not impaired. For instance, the aforementioned metal deposition film may be formed between the inside film and the outside film, or a top coat layer may be formed on the outer side of the outside film.

In a case of adding a further layer to the laminate film, the total thickness of the laminate film is preferably in a range of 70 to 300 µm.

[Raised Part Shaping Process]

For preparing the ornamental laminate film of the present invention, the laminate film having the aforementioned pattern is subjected to a three-dimensional shaping of raised part.

There is no particular limitation on the process for shaping the raised part as long as a raised part protruding toward the outside film can be formed. As described above, however, it is preferable in the present invention to use a laminate film comprising a more stretchable film as an inside film and a less stretchable film as an outside film, and to shape the laminate film by compressing a cold, warm or hot process, whereby the raised part may protrude toward the outside film.

Figure 15:
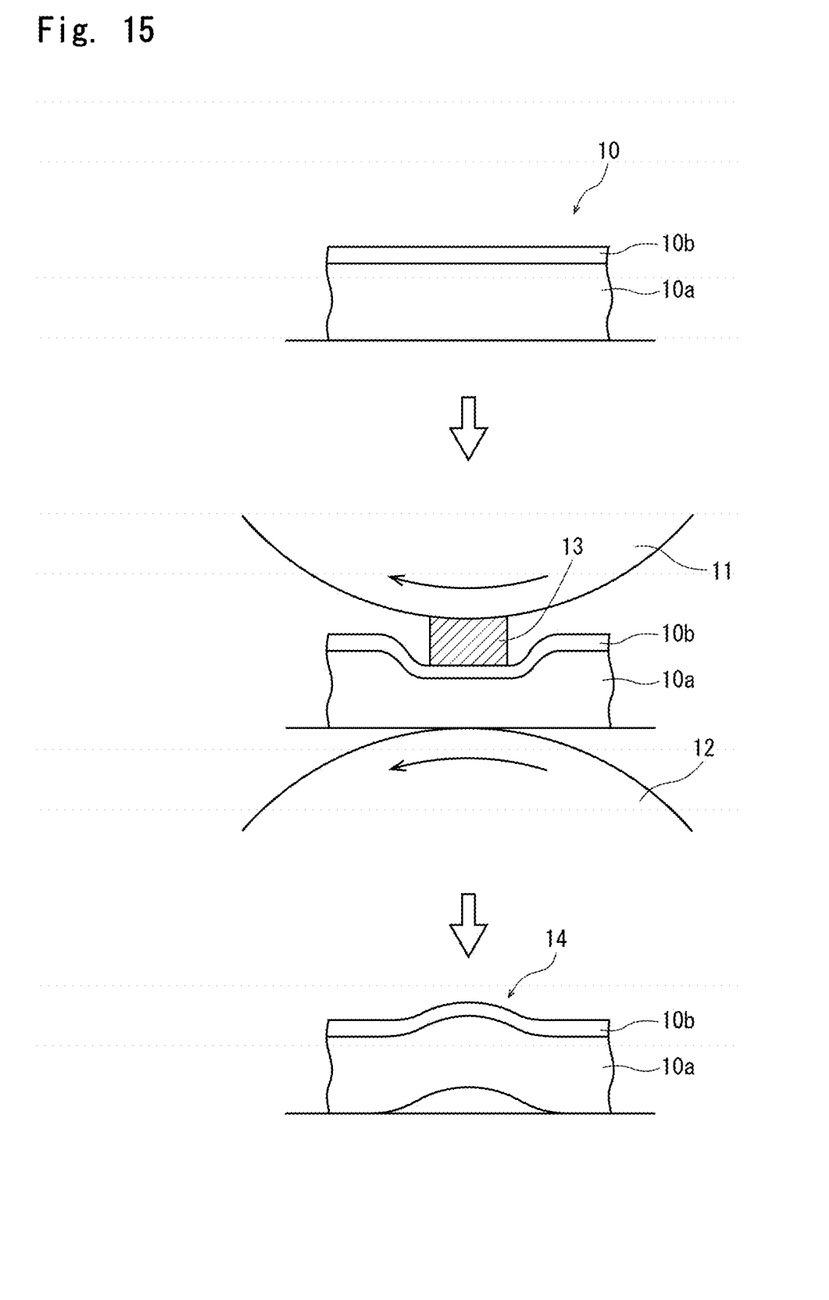
FIG. 15 is a set of diagrams for illustrating a process for shaping the raised part on the ornamental laminate film of the present invention.

FIG. 15 is a set of views to explain one example of shaping the raised part of the ornamental laminate film of the present invention. As shown in FIG. 15, a laminate film 10 having an inside film 10a and an outside film 10b is heated to room temperature or approximately the softening point of the inside film 10a. The heated laminate film 10 is subjected to shaping by placing the laminate film 10 between an anvil roll 12 and a processing roll 11 having a processing portion 13 to compress the processing portion 13 to a site to form the raised part in the thickness direction. When the pressure applied thereto is released, the compressed site protrudes toward the outside film 10b, thereby forming a raised part 14.

Figure 16:
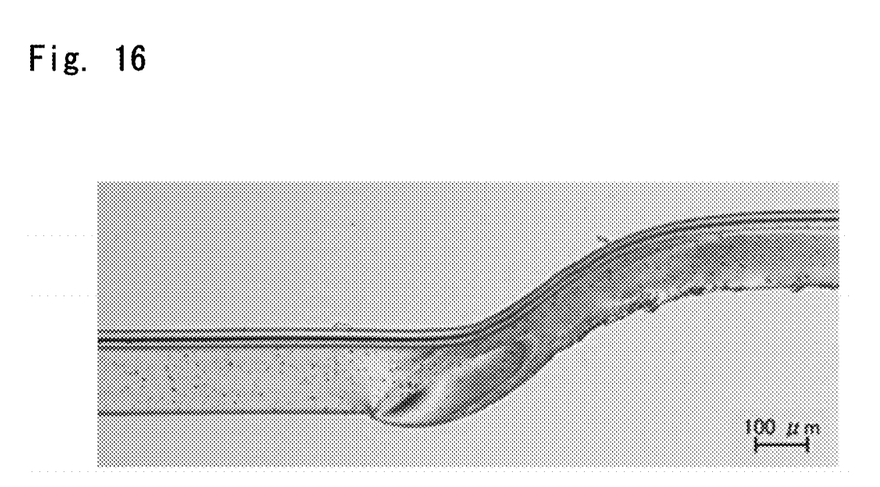
FIG. 16 is a black-and-white photocopy of a cross-sectional color photograph showing a part of a raised part of the ornamental laminate film of the present invention.

FIG. 16 is an enlarged photograph showing a cross section of a raised part area of the ornamental laminate film. The raised part is processed the most in the vicinity of the inside of the edge. The inside film is stretched greatly and squeezed outward while the outside film is not stretched substantially.

The raised part can be shaped in a cold process without heating the processing portion. Alternatively, it can be shaped in a hot process by heating the processing portion approximately to the softening temperature of the inside film or in a warm process by heating the processing portion to a temperature range between those of the cold process and the hot process. For instance, when the inside film is made of polyethylene, a warm process may be conducted by heating the processing portion to a temperature range of 35 to 80° C. or a hot process may be conducted by heating the processing portion to a temperature range of 80 to 100° C., and later the processing portion may be cooled as required.

Here, the height of the raised part is set depending on the compression applied by the processing portion. For instance, in a case of processing between a pair of rolls as shown in FIG. 15, the height is determined depending on the clearance between the processing portion 13 and the anvil roll 12.

In the specific example shown in FIG. 15, shaping by compression is conducted between a pair of rolls including the processing roll 11 having the processing portion 13. This example does not limit the technique but the anvil roll 12 may have a male mold at a site corresponding to the processing portion 13. The roll process of compression between a pair of rolls as shown in FIG. 15 may be replaced by pressing. Similarly in this case, the surface to be processed (inside film side) may be flat or a male-type surface.

The process for shaping the raised part of the ornamental laminate film of the present invention can be applied to a long-length laminated film or a set of sheet-type ornamental laminate films.

(Pouch-Type Container)

There is no particular limitation on the method for producing the pouch-type container of the present invention as long as the pouch-type container has the ornamental laminate film of the present invention. For instance, the container can be shaped by overlapping inside films of the ornamental laminate films of the present invention. Alternatively, the ornamental laminate film of the present invention may be used for one surface while another laminate film having no raised part is used for the other surface to make a pouch-type container.

In still another example, it is possible that the pouch-type container is produced by overlapping inside films of laminate films made from at least a more stretchable inside film and a less stretchable outside film and printed with a pattern, forming the overlapped laminate films into a pouch-type container, and then processing the resulting pouch-type container to shape a raised part. Similarly in this case, the raised part can be shaped on each of the pouch-type containers. In a further embodiment, a plurality of pouch-type containers formed by overlapping long-length laminate films may be arranged continuously like a long-length belt, which is processed consecutively to shape raised parts, and then cut off to provide respective pouch-type containers.

The pouch-type container can be employed as any of conventionally known pouch-type containers such as a standing pouch, a three-side seal sachet, and a four-side seal sachet, and any of these pouch-type containers equipped with a spout.

(Sealing Material)

The sealing material of the present invention can be shaped by punching through the ornamental laminate film of the present invention to have a desired shape such as an opening of a cup-shape and a tray-shape container.

EXAMPLES

1. Laminate Film

Laminate film was produced by dry-lamination of an inside film of polyethylene (120 μm), an outside film of a stretched nylon film (15 μm) printed on the inner side, and a polyethylene terephthalate film (12 μm) arranged between the inside film and the outside film. The outer side of the polyethylene terephthalate film was aluminum-deposited in advance.

If a transparent yellow ink is used for printing on the outside film, the outside film exhibits gold color due to the deposited aluminum.

2. Printing on Laminate Film and Formation of Raised Part Protruding Toward the Outside Film The laminate film was heated to 50° C. A pair of rolls prepared had an upper roll provided with a raised-part processing portion. The laminate film was processed by compressing with this raised-part processing portion in the thickness direction in a cold process, whereby printing and formation of a rhombic frame-like raised part protruding toward the outside film were conducted. The raised part had a maximum width of 5 mm and a maximum height of 0.2 mm.

In forming the rhombic frame-like raised part, the clearance between the top end of the raised-part processing portion and the lower roll (anvil roll) was set to 60 μm.

3. Evaluation

The printing on the laminate film and the ornamental effect of the rhombic frame-like raised part protruding toward the outside film were evaluated visually for two items of three-dimensionality and visibility (discrimination of raised part).

(Three-Dimensionality)

◎: excellent; ○: fair; x: poor (Visibility)

◎: very good; ○: good; x: poor

The results are shown in Table 1.

Example 1

A gold-color rhombic frame-like raised part was formed by printing in yellow on an inner side surface of an outside film and printing in black to form a rhombic frame-like shadow pattern (see FIGS. 9A and 9B).

Example 2

A gold-color rhombic frame-like raised part was formed by printing a yellow rhombic frame-like pattern and a black background on an inner side surface of an outside film (see FIGS. 13A and 1B).

Example 3

This Example was similar to Example 2, but the yellow rhombic frame-like pattern was not printed while the background was printed in black, an aluminum deposition surface with the silver-color rhombic frame-like pattern was exposed, and a silver-color rhombic frame-like raised part was formed (see FIGS. 14A and 14B).

Example 4

This Examples was similar to Example 2, but a yellow rhombic frame-like pattern and a black rhombic frame-like shadow pattern surrounding the yellow rhombic frame-like pattern were printed, the background was set as a silver-color aluminum deposition surface, and a gold-color rhombic frame-like raised part was formed (see FIGS. 11A and 11B).

Comparative Example 1

This Comparative Example was similar to Example 1, but a gold-color rhombic frame-like raised part was formed without printing a black rhombic frame-like shadow pattern (see FIGS. 8A and 8B).

Comparative Example 2

This Comparative Example was similar to Example 2, but a rhombic frame-like raised part was formed without printing a yellow rhombic frame-like pattern (see FIGS. 12A and 12B).

Comparative Example 3

This Comparative Example was similar to Example 4, but a rhombic frame-like raised part was formed without printing a yellow rhombic frame-like pattern and a shadow pattern (see FIGS. 10A and 10B).

TABLE 1

| | Printing | | | Rhombic | | Evaluation | | |
|---|---|---|---|---|---|---|---|---|
| | Rhombic frame-like pattern | Shadow pattern | Back-ground | frame-like raised part | FIG. No. | Three-dimensionality | Visibility | Total evaluation |
| Ex. 1 | Gold (identical to background) | Yes | Gold | Gold | 9 | ◎ | ○ | ○ |
| Ex. 2 | Gold | No | Black | Gold | 13 | ○ | ◎ | ○ |
| Ex. 3 | Silver | No | Black | Silver | 14 | ○ | ◎ | ○ |
| Ex. 4 | Gold | Yes | Silver | Gold | 11 | ◎ | ◎ | ◎ |
| Com. Ex. 1 | Gold (identical to background) | No | Gold | Gold | 8 | X | ○ | X |
| Com. Ex. 2 | Black (identical to background) | No | Black | Black | 12 | X | X | XX |
| Com. Ex. 3 | Silver (identical to background) | No | Silver | Silver | 10 | X | ○ | X |

\* Silver: ground color provided by aluminum deposition

Gold: ground color of aluminum deposition + transparent yellow ink

Black: solid ink printing

Shadow pattern: ink tone printing

Ex.: Example;

Com.Ex.: Comparative Example

DESCRIPTION OF REFERENCE NUMERALS

10: laminate film
11: processing roll
12: anvil roll
13: processing portion
14: raised part

The invention claimed is:

1. An ornamental laminate film made from at least an inside film and an outside film, provided with a letter and/or a pattern by printing and as a raised part protruding toward the outside film,
   wherein at least a part of the letter and/or the pattern has a metallic luster and differs in at least one of hue, brightness, chroma and glossiness from a region other than the letter and/or the pattern,
   the raised part is formed along at least a part of the letter and/or the pattern,
   a print layer constituting the letter and/or the pattern is formed on an inner side of the outside film, and
   the raised part is formed along an outline of the letter and/or the pattern, and at least a part of the letter and/or the pattern is partitioned by the raised part and has an inner region with a surface roughness higher than a surface roughness in the region other than the letter and/or the pattern, and the inner region and the region other than the letter and/or the pattern are different from each other in glossiness.

2. The ornamental laminate film according to claim 1, wherein the metallic luster of the letter and/or the pattern is derived from a deposition layer.

3. The ornamental laminate film according to claim 1, wherein the letter and/or the pattern has a difference in brightness from the region other than the letter and/or the pattern, the brightness of the letter and/or the pattern is higher than the brightness of the region other than the letter and/or the pattern, and the raised part is formed on an area of the letter and/or the pattern.

4. The ornamental laminate film according to claim 1, wherein an area that is expected to be shaded when the raised part is irradiated with light from one direction is provided with printing of a shadow of the raised part.

5. The ornamental laminate film according to claim 1, wherein the raised part has a surface roughness higher than a surface roughness of an area surrounding the raised part, and the raised part and the area surrounding the raised part are different from each other in glossiness.

6. The ornamental laminate film according to claim 1, wherein the raised part has a height in a range of 0.1 to 0.35 mm, and a width of not more than 5 mm.

7. The ornamental laminate film according to claim 1, wherein the raised part is formed by shaping a laminate film by compressing a cold, warm or hot process to allow the laminate film to protrude toward the outside film.

8. The ornamental laminate film according to claim 1, wherein the inside film stretches to a greater degree than the outside film in a vicinity of an inside of an edge of the raised part.

9. The ornamental laminate film according to claim 1, wherein the laminate film comprises an inside film of polyethylene, an outside film of stretched nylon or stretched polyethylene terephthalate, and an aluminum deposition stretched polyethylene terephthalate film or an aluminum deposition stretched nylon film arranged between the inside film and the outside film.

10. A pouch-type container having the ornamental laminate film according to claim 1.

11. A sealing material comprising the ornamental laminate film according to claim 1.

* * * * *